(12) United States Patent
Verstraete et al.

(10) Patent No.: US 11,357,233 B2
(45) Date of Patent: Jun. 14, 2022

(54) MICROBIAL CONSORTIUM FOR SUPPRESSING NON-GRAS MICROORGANISMS ON A SURFACE

(71) Applicant: AVECOM NV, Wondelgem (BE)

(72) Inventors: Willy Verstraete, Wondelgem (BE); Vanda Isabel Machado Branco, Wondelgem (BE); Mariane Adèle Leona Wambeke, Wondelgem (BE)

(73) Assignee: AVECOM NV, Wondelgem (BE)

( * ) Notice: Subject to any disclaimer, the term of this patent is extended or adjusted under 35 U.S.C. 154(b) by 140 days.

(21) Appl. No.: 16/623,055

(22) PCT Filed: Jun. 14, 2018

(86) PCT No.: PCT/EP2018/065813
§ 371 (c)(1),
(2) Date: Dec. 16, 2019

(87) PCT Pub. No.: WO2018/229192
PCT Pub. Date: Dec. 20, 2018

(65) Prior Publication Data
US 2020/0163343 A1    May 28, 2020

(30) Foreign Application Priority Data
Jun. 16, 2017 (BE) .................... 2017/5431

(51) Int. Cl.
*A01N 63/20* (2020.01)
*A01N 63/22* (2020.01)

(52) U.S. Cl.
CPC ............. *A01N 63/20* (2020.01); *A01N 63/22* (2020.01)

(58) Field of Classification Search
CPC .......... A01N 63/20; A01N 63/22; C12N 1/20; C12N 1/205
See application file for complete search history.

(56) References Cited

U.S. PATENT DOCUMENTS

| | | | | |
|---|---|---|---|---|
| 5,821,112 A | * | 10/1998 | Botto | C02F 3/34 435/262 |
| 2015/0119244 A1 | | 4/2015 | Lopez-Cervantes | |
| 2017/0037363 A1 | | 2/2017 | Whitlock et al. | |
| 2018/0237353 A1 | * | 8/2018 | Yoon | A01N 63/00 |

FOREIGN PATENT DOCUMENTS

| WO | WO-2016013699 A1 * | 1/2016 | ............. E01C 19/48 |
|---|---|---|---|
| WO | WO-2016/135699 A1 | 9/2016 | |
| WO | WO-2016/135700 A1 | 9/2016 | |

OTHER PUBLICATIONS

U.S. Appl. No. 16/008,059 (Year: 2018).*
International Search Report and Written Opinion dated Jul. 12, 2018 for PCT International Application No. PCT/EP2018/065813, Verstraete et al., "Microbial Consortium for Suppressing Non-Gras Microorganisms on a Surface," filed Jun. 14, 2018 (8 pages).

* cited by examiner

*Primary Examiner* — Ruth A Davis
(74) *Attorney, Agent, or Firm* — Clark & Elbing LLP

(57) ABSTRACT

The current invention provides for a microbial consortium comprising one or more ammonium-oxidizing strains which are generally recognized as safe (GRAS) and which are selected from the group of *Nitrosomonas, Nitrosospira, Nitrosopumilus, Cenarchaeum, Nitrosoarchaeum, Nitrosocaldus, Caldiarchaeum*; and one or more GRAS strains which are commensal to the one or more ammonium-oxidizing strains, and which are selected from the group of *Acinetobacter, Alcaligenes, Arthrobacter, Azospirillum, Azotobacter, Bacillus, Beijerinckia, Enterobacter, Erwinia, Flavobacterium, Rhizobium, Serratia* and *Deinococcus*.

11 Claims, No Drawings

MICROBIAL CONSORTIUM FOR SUPPRESSING NON-GRAS MICROORGANISMS ON A SURFACE

TECHNICAL FIELD

The invention relates to a novel microbial consortium. The microbial consortium comprises one or more GRAS (Generally Recognized As Safe) ammonium-oxidizing strains, and one or more GRAS strains which are commensal to the one or more ammonium-oxidizing strains.

BACKGROUND

Surfaces can be prone to organic residues which can provide suitable environments for the growth of microorganisms. Typically, but not always, the microorganisms are not detrimental to the health of the individual. The presence of such microorganisms makes it more challenging for other microorganisms, including more harmful microorganisms, to populate the surface. However, when such surfaces are treated, the population of the microorganisms on the surface can be reduced. This creates an opportunity for other microorganisms to grow on such treated surfaces.

Where high levels of hygiene is desired, such as kitchen toilets, bathrooms, and surfaces that small infants can come into contact with, the surface can be treated with compositions comprising an antibacterial agent. However, over time, such antibacterial agents lose their efficacy. Therefore, a need remains for an approach which results in reduced opportunities for harmful microorganisms to grow and populate the treated surface.

Microorganisms are omnipresent in our daily environments. Most of these microorganisms are not harmful to higher organisms, and may even be beneficial to the health of higher organisms, for example human health. However, some microorganisms are pathogenic, and infection of such pathogens can be harmful for the health. It is therefore important to minimalize the risk of such infections by decreasing the presence of such pathogens as much as possible.

While a good cleaning protocol—such as often performed in hospitals—results in a reduced presence of pathogens and a lowering of infections, a great portion of the pathogens remains unaffected. More in particular, it is known that every surface comprises a biofilm. Biofilms are accumulations of microorganisms that are held together by a highly persistent matrix of organic compounds, mostly proteins and polysaccharides. Such biofilms provide an ideal environment for the growth of unwanted microorganisms, thereby shielding and protecting the microorganisms from the outside. As a consequence, cleaning and disinfection of surfaces does not result in the removal or depletion of microorganisms present in biofilms. In addition, the cleaning and disinfection of surfaces is merely temporary of nature because microorganisms, and thus also pathogens, can reappear without hindrance on disinfected and/or cleaned surfaces.

Although chemical approaches and methods for disinfection of surfaces are already known in the art, these approaches often comprise use of harmful chlorinated compounds, emission of unpleasant odors, discoloration of fibers and surfaces, damaging of floor finishes, and potentially interaction of compounds with other chemicals.

In addition, such chemical approaches may temporarily breach biofilms present on surfaces and disinfect said surfaces momentarily but do not provide a long-term solution to decrease the vitality and the presence of pathogens, thereby diminishing the risk of infections. An accessory problem in the current state of the art is the impotence of currently available surface disinfection methods and/or products to be effective in a broad range of temperatures, pH and humidity.

The use of microorganisms and enzymes for cleaning surfaces are known. For instance, WO 2016/170479 A1 relates to products for "cleaning, sanification and hygienization", comprising a base solution to which probiotic bacteria and bacteriophage elements are mixed; the probiotic bacteria being preferably of the *Bacillus subtilis, Bacillus megaterium* and *Bacillus pumilus* genera, while the bacteriophage elements comprise, as an alternative or in combination, bacteriophages of the Caudavirales, Microviridae, Leviviridae, inoviridae, Tactiviridae, Corticoviridae families. CN 103122327 B relates to a bacterial culture and compositions comprising them, and their use for washing clothes. U.S. Pat. No. 7,951,767 B2 and U.S. Pat. No. 7,795,199 B2 relate to antimicrobial and cleaning compositions including an amine antimicrobial agent; a borate salt; and spores (bacterial or fungal), vegetative bacteria, fungi, or enzyme, and to methods of using the composition. EP 2873723 A1 relates to a composition for use as a cleaning agent, comprising an anolyte, and a lactic acid bacteria belonging to the genus *Lactobacillus*, as well as a method for cleaning a surface and a method for delaying regrowth of microbes, and a method for reducing the number of resistant microbes on a surface. WO 2015/000812 A1 relates to a process for cleaning a surface wherein said surface is treated with at least one culture of at least one organism or a formulation comprising the culture. EP 2759590 A1 relates to compositions for deodorizing and cleaning, the compositions comprising one or more *Bacillus subtilis* strain(s) and/or extract(s) thereof, one or more surfactant(s), one or more fragrance(s), one or more descaling agent(s), and one or more effervescent agent(s). EP2705140 A1 relates to a microorganism, of the order of lactic acid bacteria or analog, fragment, derivative, mutant or combination thereof, which can be co-aggregated with at least *Staphylococcus aureus* or *Pseudomonas aeruginosa*. WO 2010/130541 A1 relates to a cleaner for hard surfaces, especially a sanitary cleaner which contains microorganisms for the decomposition and/or removal of inorganic stains and/or residues and to the use thereof for cleaning and/or finishing hard surfaces, especially for cleaning and/or finishing ceramic surfaces in and around toilets and urinals. WO 2008021761 A3 relates to bacteria cultures and composition comprising one or more cultures, in addition to methods of washing or cleaning laundry or fabrics and surfaces. WO 2002/033035 A1 relates to an aqueous hard surface cleaning composition containing anionic and nonionic surfactants, an enzyme mixture such as lipase/alpha-amylase for breaking down organic compounds; an activator for rendering the enzyme more active; water; and a culture of *Bacillus subtilis* and *Bacillus amyloliquefaciens* for degrading and assimilating organic compounds. U.S. Pat. No. 6,387,874 B1 relates to an aqueous cleaning composition comprising: an organic acid of at least 5% by weight of the cleaning compositions; a spore forming microbial composition; a blend of wetting agents; a thickening agent and water. WO 2000/063338 A1 relates to an aqueous disinfectant and hard surface cleaning composition comprising: a quaternary ammonium compound; a spore forming microbial composition; and a surfactant, the composition being used to clean a hard surface containing a diverse microbial flora, cleaning and disinfecting by killing off undesirable microorganisms and leaving behind *Bacillus* spores which then germinate and degrade any remaining ongoing residues. US 20130184196 A1 relates to aqueous compositions comprising at least one strain of Class 1 *Bacillus* bacterial spores, selected from *Bacillus cirulans, Bacillus megaterium, Bacillus lichenforms, Bacillus pumilus, Bacillus sphaericus, Bacillus subtilis* sub species 10144 and *Bacillus subtilis* sub species 8646, a terpene and one or more surfactants.

Microorganisms and especially microbial consortia have been previously discussed as suitable means for repopulating surfaces or areas by beneficial microorganisms, or for the eradication of harmful organisms. However, it remains demanding to repopulate surfaces with the desired microbial consortia, since it is challenging to populate a surface with sustainable consortia of the desired microbes.

The current invention aims to provide a solution for at least one of the problems mentioned above, by providing a microbial consortium which is suitable for effective removal and long-term shielding of unwanted and/or harmful microorganisms from surfaces.

SUMMARY OF THE INVENTION

The present invention provides a microbial consortium according to claim 1. More in particular, the present invention provides in a microbial consortium, whereby said consortium comprises one or more ammonium-oxidizing strains which are generally recognized as safe (GRAS), selected from the group of *Nitrosomonas, Nitrosospira, Nitrosopumilus, Cenarchaeum, Nitrosoarchaeum, Nitrosocaldus,* and *Caldiarchaeum*; and one or more GRAS strains which are commensal to the one or more ammonium-oxidizing strains, and which are selected from the group of *Acinetobacter, Alcaligenes, Arthrobacter, Azospirillum, Azotobacter, Bacillus, Beijerinckia, Enterobacter, Erwinia, Flavobacterium, Rhizobium, Serratia* and *Deinococcus*.

Such microbial consortium is safe for higher organisms and more resilient to various external shocks such as temperature, pH changes, osmotic pressure and nutrient availability. Furthermore, such microbial consortium shows a synergistic increase on the nitrifying activity and oxygen uptake, and allows thriving of one or more commensal strains. Application of such microbial consortium is efficient in recolonization of a surface and allows for long-term repulsion of unwanted or harmful microorganisms from a surface in a safe, harmless way.

DETAILED DESCRIPTION OF THE INVENTION

The present invention provides in a microbial consortium whereby said consortium comprises: one or more ammonium-oxidizing strains which are generally recognized as safe (GRAS), selected from the group of *Nitrosomonas, Nitrosospira, Nitrosopumilus, Cenarchaeum, Nitrosoarchaeum, Nitrosocaldus,* and *Caldiarchaeum*; and one or more GRAS strains which are commensal to the one or more ammonium-oxidizing strains, and which are selected from the group of *Acinetobacter, Alcaligenes, Arthrobacter, Azospirillum, Azotobacter, Bacillus, Beijerinckia, Enterobacter, Erwinia, Flavobacterium, Rhizobium, Serratia* and *Deinococcus*. Application of such microbial consortium aids in preventing the spread of non-GRAS microbes on the treated surface.

US2017/037363A1, WO2016/135699A1, WO2016/135700A1 and US2015/119244A1 describe microbial compositions which can be used to suppress the growth of undesired microorganisms, yet do not mention any commensal relationship between strains present within the microbial compositions. US2017/037363A1 mentions that administering ammonia oxidizing bacteria provides for an increase in the proportion of non-pathogenic bacteria on a surface, which non-pathogenic bacteria may be commensal non-pathogenic bacteria. It should be clear for a person skilled in the art that said commensal non-pathogenic bacteria are no part of the microbial composition according to US2017/037363A1 which is administered to the surface.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" and "approximately" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifiers "about" and "approximately" refer is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "% by weight", "weight percent", "% wt" or "wt %", here and throughout the description unless otherwise defined, refers to the relative weight of the respective component based on the overall weight of a composition.

As used herein, the terms "microorganisms", "microbial organisms" and "microbes" are used synonymously and should be interpreted broadly. The terms include but are not limited to the two prokaryotic domains, Bacteria and Archaea, as well as eukaryotic fungi and protists.

In a first aspect, the present invention comprises a microbial consortium wherein said consortium comprises one or more ammonium-oxidizing strains which are generally recognized as safe (GRAS), selected from the group of *Nitrosomonas, Nitrosospira, Nitrosopumilus, Cenarchaeum, Nitrosoarchaeum, Nitrosocaldus,* and *Caldiarchaeum*; and one or more GRAS strains which are commensal to the one or more ammonium-oxidizing strains, and which are selected from the group of *Acinetobacter, Alcaligenes, Arthrobacter, Azospirillum, Azotobacter, Bacillus, Beijerinckia, Enterobacter, Erwinia, Flavobacterium, Rhizobium, Serratia* and *Deinococcus*.

The term "microbial consortium" as used herein refers to a microbial community comprising two or more species or strains which act summatively as a unit.

As used herein, the term "strain" refers to microorganisms of a particular species which have common characteristics. Unless indicated to the contrary, the terms "strain" and "cell" are used interchangeably herein. As one skilled in the art would recognize microorganism strains are composed of individual cells. Further, individual microorganism cells have specific characteristics which identifies them as being member of their particular strain.

The term "GRAS" is used herein as an acronym for "generally recognized as safe" and refers to the American Food and Drug Administration (FDA) designation that a microbial organism is considered to be safe, by experts.

A microbial consortium according to the present invention comprises merely GRAS-strains. GRAS strains are shown, by experts, to be safe for addition to food under conditions of its intended use. Hence, a microbial consortium comprised merely of GRAS strains is considered to be safe and does not present a risk or disadvantage to higher organisms.

A microbial consortium according to the present invention comprises one or more ammonium-oxidizing strains and one or more strains which are commensal to the ammonium-oxidizing strains. As mentioned above, strains present in said microbial consortium are GRAS strains, and therefore do not present a risk or disadvantage to higher organisms. Ammonium-oxidizing strains are aerobic and chemolithotrophic microbes that are capable of using ammonium or ammonia as a source of energy, and are able to produce complex organic compounds—for example carbohydrates, fats and proteins—from simple substances present in its surroundings—for example carbon dioxide. The ability of strains to oxidize ammonium (or ammonia) to nitrite is dependent on the presence of ammonia monooxygenase and hydroxylamine oxidoreductase. Both these enzymes are key in the nitrification process, and more in particular in the oxidation of ammonium (or ammonia) to nitrite.

In the present invention, ammonium-oxidizing strains live together with heterotrophs in a commensal microbial consortium. In such commensal microbial consortium, ammonium-oxidizing strains produce and secrete complex organic compounds which can be taken up and used as nutrients by heterotrophs for their growth and survival. It is known from literature that carbon fixation—mostly in the form of carbon dioxide—in chemolithotrophs is relatively inefficient as compared to uptake of organic carbon in heterotrophs. As a consequence, ammonium-oxidizing strains have it difficult to thrive in the presence of heterotrophs, whereas the increased availability of complex carbon compounds stimulates growth, proliferation and survival of heterotrophs present in such microbial consortium. As a result, heterotrophic strains in the microbial consortium will thrive due to the presence of the ammonium-oxidizing strains without directly affecting the ammonium-oxidizing strains in a negative way. Such relationship is defined as being commensal. The heterotrophic strains in the microbial consortium are therefore termed "commensal strains" in the present invention.

The term "commensal" as used herein refers to an interdependent relationship between two groups of microorganisms within a microbial consortium, which microbial consortium is also called a commensal microbial consortium. In the context of the present invention, i) one of the groups corresponds to one or more ammonium-oxidizing strains which are GRAS, and ii) the second group corresponds to one or more GRAS strains which are commensal to the one or more ammonium-oxidizing strains. With the words "which are commensal to" the interdependent relationship between the two groups of microorganisms is indicated, meaning that i) the one or more ammonium-oxidizing strains which are GRAS and ii) the one or more GRAS strains which are commensal to the one or more ammonium-oxidizing strains benefit from each other. The mutual benefit between both groups supports the stability of the microbial consortium and thus the performance thereof in terms of preventing the spread of non-GRAS microbes on a surface treated with the microbial consortium. This commensal relationship as defined herein can also be understood as a food chain relationship. According to such food chain relationship, i) said one or more ammonium-oxidizing strains which are GRAS can be interpreted as "primary consumers", and ii) said one or more GRAS strains which are commensal to the one or more ammonium-oxidizing strains can be interpreted as "secondary consumers". The primary consumers grow on inorganic nutrients such as minerals and ammonia. The secondary consumers consume organic substances and are therefore dependent on the proliferation of primary consumers, since they will thrive on organic biomass, and in particular on one or more complex organic compounds such as pyruvate, which are produced by said primary consumers. Within this relationship, the secondary consumers occur as satellites around the primary consumers. In turn, the secondary consumers improve the ambient conditions for the primary consumers. For example, the study of Keluskar et al. 2013 (doi: 10.1007/s00203-013-0926-2) has shown support of grow of *Nitrosomonas* sp. RA (which can be classified as a primary consumer) by siderophores produced by *Pusillimonas* sp. (which can be classified as a secondary consumer).

A microbial consortium comprises preferably one or more ammonium-oxidizing strains which feed and survive on minerals.

Preferably, a microbial consortium according to the present invention comprises one or more GRAS ammonium-oxidizing strains selected from the group of *Nitrosomonas, Nitrosospira, Nitrosopumilus, Cenarchaeum, Nitrosoarchaeum, Nitrosocaldus*, and *Caldiarchaeum*.

The inventors of the present invention have found that strains selected from the group of *Nitrosomonas, Nitrosospira, Nitrosopumilus, Cenarchaeum, Nitrosoarchaeum, Nitrosocaldus*, and *Caldiarchaeum* comprise both ammonium monooxygenase and hydroxylamine oxidoreductase, and show sufficient nitrifying activity to provide sufficient amounts of complex organic compounds which may serve as nutrients for commensal strains. Preferably, merely GRAS-designated strains are selected. In this way, the risk of negatively affecting higher organisms is kept at a minimum, and more preferably, merely strains which present no risk of negatively affecting higher organisms are used.

A microbial consortium of the current invention further comprises one or more GRAS heterotrophic strains which are commensal to the ammonium-oxidizing strains. Said one or more commensal strains are chosen from the group of *Acinetobacter, Alcaligenes, Arthrobacter, Azospirillum, Azotobacter, Bacillus, Beijerinckia, Enterobacter, Erwinia, Flavobacterium, Rhizobium, Serratia* and *Deinococcus*.

It was found by the inventors that commensal strains chosen from the group of *Acinetobacter, Alcaligenes, Arthrobacter, Azospirillum, Azotobacter, Bacillus, Beijerinckia, Enterobacter, Erwinia, Flavobacterium, Rhizobium, Serratia* and *Deinococcus* are able to feed, and efficiently grow, on complex organic compounds produced by the ammonium-oxidizing strains. Preferably, merely GRAS-designated strains are selected to minimize the risk of negatively affecting higher organisms. More preferably, merely strains which present no risk of negatively affecting higher organisms are used.

The strains as listed throughout the invention are readily known by the skilled in the art and can be obtained from official deposit organizations, such as, but not limiting to the Belgian Co-ordinated Collections of Strains (BCCM), ATCC and NCIMB Ltd.

The inventors of the current invention have found that a microbial consortium comprising one or more such ammonium-oxidizing strains and one or more such commensal strains shows a synergistic effect as compared to the corresponding individual strains of the strains composing the microbial consortium. More in particular, it was found that a microbial consortium comprising one or more such ammonium-oxidizing strains and one or more such commensal strains shows (a) a higher nitrifying activity as compared to the individual one or more ammonium-oxidizing strains, (b) a higher oxygen uptake as compared to the individual one or more commensal strains, and (c) a lower dying rate and higher resilience as compared to individual strains of the microbial consortium. Hence, there is a remarkable synergism between the two groups of organisms in the invention.

The term "resilience" as used herein, describes the ability of a cell to cope with environmental changes.

Besides, the term "resilience" is used herein to describe the ability of a microbial consortium to cope with environmental changes. A monoculture could lose its potency and become lower in numbers due to altering ambient conditions, whereas a consortia of multiple species or strains can better withstand these changes, corresponding with a higher resistance, or better restore its original cell numbers and potency after a disturbance, corresponding to a better resilience.

The microbial consortium may comprise two or more ammonium-oxidizing GRAS strains chosen from the group mentioned above and two or more GRAS strains which are commensal to said two or more GRAS ammonium-oxidizing strains and chosen from the group mentioned above. More preferably, the microbial consortium according to the present invention comprises two ammonium-oxidizing GRAS strains and three GRAS strains which are commensal to said two ammonium-oxidizing strains and which are chosen from the group mentioned above.

As explained above, ammonium-oxidizing strains have a less efficient carbon fixation process compared to the organic carbon uptake of the heterotrophic commensal strains. Hence, during long-term cultivation of a microbial consortium as described above, it is likely that—after a certain period of time—the commensal strains will thrive, thereby suppressing the ammonium-oxidizing strains. However, said ammonium-oxidizing strains are essential to allow thriving of said commensal strains as the latter feed on the complex organic compounds produced by said ammonium-oxidizing strains. The present invention may therefore provide an optimal ratio of the amount of ammonium-oxidizing cells over the amount of commensal cells.

In an embodiment, a microbial consortium according to the present invention comprises an excess of the one or more ammonium-oxidizing strains as compared to the one or more commensal strains.

In an embodiment, a microbial consortium according to the present invention comprises cells of the one or more ammonium-oxidizing strains in a ratio of between 100:10 and 100:0.1 as compared to cells of the one or more commensal strains. In the current context, it has to be understood that said cells refer to viable cells. In an embodiment, said cells are counted using flow cytometry.

In an embodiment, a microbial consortium according to the present invention comprises biomass of the one or more ammonium-oxidizing strains in a ratio of between 100:10 and 100:0.1 as compared to biomass of the one or more commensal strains. In the current context, it has to be understood that said biomass refers to viable biomass. In an embodiment, said biomass is measured using flow cytometry.

The inventors found that such ratio allows for cultivation of a microbial consortium as mentioned above without suppression and/or depletion of the one or more ammonium-oxidizing strains or commensal strains for a period of time that goes from several months to a year.

The ratio between cells or biomass of the one or more ammonium-oxidizing strains on the one hand and cells or biomass of the one or more commensal strains on the other hand can be experimentally measured by using any suitable method as known from the state of the art. For example, quantitative polymerase chain reaction (qPCR) assays specifically targeting ammonium-oxidizing bacteria (AOB) and ammonium-oxidizing Archaea (AOA) as compared to the total prokaryotic community (eubacterial primers targeting the 16S gene) can be used to determine the ratio (between cells or between biomass) of both groups. Besides, flow cytometry can be used to determine the overall cell count or amount of biomass, as well as the percentage of viable cells (life-death staining). Furthermore, flow cytometry can be useful for rapid fingerprinting and can be implemented as a quality parameter, since it can answer the questions if the composition of the microbial consortium has altered over time, and if the count of viable cells or biomass is sufficient.

A microbial consortium according to the present invention may comprises one or more ammonium-oxidizing strains selected from the group of *Nitrosomonas marina, Nitrosomonas nitrosa, Nitrosomonas eutropha, Nitrosomonas europaea, Nitrosomonas cryotolerans, Nitrosospira multiformis, Nitrosospira lacus, Nitrosopumilus maritimus, Cenarchaeum symbiosum, Nitrosoarchaeum limnia, Nitrosocaldus yellowstonii*, and *Caldiarchaeum subterraneum*.

Said strains are GRAS strains and comprise both ammonium monooxygenase and hydroxylamine oxidoreductase which allows cells for oxidation of ammonium (or ammonia) to nitrite to generate energy. In turn, this energy is used for fixation of carbon into complex organic compounds which may serve as nutrients for one or more commensal strains.

The microbial consortium can comprise one or more commensal strains selected from the group of *Bacillus subtilis, Bacillus megaterium, Bacillus polymyxa, Bacillus amyloliquefaciens, Bacillus cereus, Bacillus japonicum* and from the group of *Deinococcus*. For the purpose of the current invention, the group of *Deinococcus* is to be understood as *Deinococcus* bacteria such as but without limitation, *D. geothermalis, D. cellulolysiticus, D. radiodurans, D. proteolyticus, D. radiopugnans, D. radiophilus, D. grandis, D. indicus, D. frigens, D. saxicola, D. maricopensis, D. marmoris, D. deserti, D. murrayi, D. aerius, D. aerolatus, D. aerophilus, D. aetherius, D. alpinitundrae, D. altitudinis, D. apachensis, D. aquaticus, D. aquatilis, D. aquiradiocola, D. aquivivus, D. caeni, D. claudionis, D. ficus, D. gobiensis, D. hohokamensis, D. hopiensis, D. misasensis, D. navajonensis, D. papagonensis, D. peraridilitoris, D. pimensis, D. piscis, D. radiomollis, D. roseus, D. sonorensis, D. wulu-*

*muqiensis, D. xibeiensis, D. xinjiangensis, D. yavapaiensis* or *D. yunweiensis* bacterium. Preferred *Deinococcus* bacteria are *D. geothermalis, D. cellulolysiticus, D. deserti, D. murrayi*, and *D. radiodurans*.

Said strains are designated as GRAS strains by the United States Food and Drug Administration (FDA), and are commensal to one or more of the ammonium-oxidizing strains mentioned above. More in particular, said commensal strains are able to feed on one or more complex organic compounds produced by one or more of the ammonium-oxidizing strains which allows for an increased growth and survival rate of said commensal strains. In addition, said commensal strains are able to grow at relatively high confluences, thereby allowing to compactly occupy surfaces, objects and/or areas.

Furthermore, the inventors of the present invention have found that a microbial consortium comprising one or more of said ammonium-oxidizing strains and one or more of said commensal strains showed a substantial synergistic effect on the nitrifying activity, oxygen uptake and resilience as compared to a microbial population merely comprising the one or more ammonium-oxidizing strains present in the microbial consortium or the one or more commensal strains present in the microbial consortium.

The microbial consortium shows an enhanced resilience as compared to a separate population of the one or more ammonium-oxidizing strains and as compared to a separate population of the one or more commensal strains.

It was found that a microbial consortium of the invention shows a higher survival rate and a higher resilience as compared to individual populations of both the one or more ammonium-oxidizing strains and the one or more commensal strains present in the microbial consortium. This illustrates a synergistic effect of a microbial consortium of the invention in view of the strains composing the microbial consortium.

The organisms present in the microbial consortium will preferably be in a dormant state, meaning that the microbial activity will be minimal and negligible, when stored and thus not being applied to a surface or for use in recolonization of a surface. Upon application the microbial consortium to surfaces under optimal conditions, the biological activity of the microbial consortium will be activated and maximized. Said optimal conditions are defined by room temperatures comprised in the mesophilic range (between 15 and 28° C.), pH around neutral values (7±0.5) and oxygen partial pressure stable around standard values for air (21% O2) in combination with presence of nutrients (which are inherently present on the surfaces on which they are applied). Under these conditions, the dormant organisms in the consortium will be activated, until they reach their maximal activity. During dormant stage, one or more essential factors for the biological activity are absent, often these are the required nutrients (salts and substrates) and oxygen levels.

The microbial consortium according to the present invention can exhibit under optimal conditions and when in activated state a nitrifying activity of at least 0.16 gram nitrogen per gram VSS per day, more preferably at least 0.18 gram nitrogen per gram VSS per day, and most preferably at least 0.20 gram nitrogen per gram VSS per day. A nitrifying activity of between 0.8 gram and 0.5 gram nitrogen per gram VSS per day can be observed.

The term "VSS" as used herein refers to the volatile suspended solids, and more in particular to the organic content of suspended solids.

Methods for determining the nitrifying activity of a microbial population, such as a microbial consortium, are known to a skilled person. By means of a non-limiting example, the nitrifying activity of a microbial population can be determined by a nitrifying activity test (NAT), done by measuring the production of nitrite respectively nitrate per unit time and per unit microbial biomass in a well aerated aquatic environment at neutral pH and normal room temperature.

A microbial consortium of the present invention can exhibit under optimal conditions and when in activated state an oxygen uptake rate of at least 8 mg oxygen per gram VSS per hour, more preferably at least 200 mg oxygen per gram VSS per hour, and most preferably at least 10 gram oxygen per gram VSS per hour. In a further preferred embodiment, an oxygen uptake rate of between 4 mg and 25 mg oxygen per gram VSS per hour is observed. Methods for determining the oxygen uptake rate of a microbial population, such as a microbial consortium, are known to a skilled person. By means of a non-limiting example, the oxygen uptake rate of a microbial population can be determined by measuring by means of an electrode the amount of oxygen dissolved in water and its decrease of when the aqueous solution is provided with living microorganisms and a substrate which they can oxidize.

Microorganisms are dependent on moisture or water to grow and reproduce, and hence, for the survival in a certain environment.

The microbial consortium according to the invention may be provided as part of a composition, such as an aqueous suspension. The microbial consortium can be formulated as an aqueous suspension which has a water activity (aw) of at least 0.91, and more preferably at least 0.95.

Being formulated as an aqueous suspension allows for a more uniform distribution of cells of the microbial consortium, for increased accessibility of nutrients to strains of the microbial consortium, and for increased growth and survival of strains in the microbial consortium.

The microbial consortium according to the invention may be formulated as a suspension comprising an overall population density of between 1000 to 100 000 000 microorganisms per ml, more preferably 10 000 to 10 000 000 microorganisms per ml, and most preferably 100 000 to 1 000 000 microorganisms per ml.

The inventors of the present invention have found that such population density is optimal for growth and proliferation of the strains of the microbial consortium according to the present invention. More in particular, the microbial consortium according to the present invention, whether or not provided as a formulation or suspension, may be subcultured to prolong the lifespan of the microbial consortium.

A microbial consortium according to the present invention may be combined with one or more appropriate additives known by a person skilled in the art. Preferably, the microbial consortium is provided with one or more appropriate additives. More preferably, a microbial consortium is provided with one or more additives selected from the group of preserving agents, osmolytes, pH-buffering agents, reduction potential regulators, surface active agents, odor-controlling agents and surface-improving compounds.

The microbial consortium can be provided with one or more preserving agents. Preferably, the one or more preserving agents are selected from the group of slow releasing nitrogen compounds to feed the nitrifiers, light scavenging agents to shield the nitrifiers from light damage and bicarbonate to quench hydroxyl radicals.

As used herein, the term "preserving agent" is not used in its narrow sense to describe agents which absolutely prevent the growth of microorganisms but rather this term is used generically to include agents which retard, inhibit, or prevent the growth of certain groups of microorganisms, preferably undesired groups of microorganisms.

Addition of one or more preserving agents to the microbial consortium allows for retardation, inhibition and/or prevention of growth of unwanted microorganisms in the microbial consortium. In this way, the microbial consortium is minimally affected and/or contaminated by growth or presence of unwanted microorganisms.

The microbial consortium may be provided as a composition which comprises between 0.5 and 2 mg/ml, such as 1 mg/ml of one or more preserving agents.

The microbial consortium can be provided in a composition which comprises one or more osmolytes. Preferably, the one or more osmolytes are salts. More preferably, the one or more osmolytes are selected from the group of sodium chloride or sulfate or phosphate, calcium chloride or sulfate or phosphate and magnesium chloride or sulfate or phosphate.

The term "osmolyte" refers to an agent or compound that lends osmolality to an aqueous composition without negatively affecting a microbial consortium incorporated in the composition.

Addition of one or more osmolytes to a composition comprising a microbial consortium according to the present invention allows for providing an osmotic pressure which is optimal for the cells of the microbial consortium. Osmolytes, and an optimal osmotic pressure, are important for cellular functions and cell survival. More in particular, osmolytes, and an optimal osmotic pressure, maintain cell volume and fluid balance in cells, and osmolytes contribute to protein folding. Hence, addition of one or more osmolytes to a composition comprising the microbial consortium, allows for providing an optimal osmotic pressure to the strains of a microbial consortium.

The microbial consortium can be provided as a composition which comprises between 0.5 and 2 mg/ml, such as 1 mg/ml of one or more osmolytes.

It is already known that pH has a great impact on the growth and survival of microorganisms. Each strain has a pH range within which growth is possible, and typically, each strain shows a well-defined pH-optimum. Such pH-optimum is the pH at which a certain strain shows optimal growth and survival. It is therefore advantageous to provide an environment, such as a composition, for the microbial consortium according to the present invention that corresponds with the pH-optimum of the strains comprising the microbial consortium. In this way optimal growth and survival conditions are allowed. Addition of one or more pH-buffering agents to a composition comprising a microbial consortium according to the present invention, allows for buffering of the composition at an optimal pH.

By preference, an optimal pH will be from 5 to 10, preferably from 6 to 8, more preferably from 6.5 to 7.5.

The microbial consortium is preferably provided as part of a composition which comprises one or more pH-buffering agents. Such compositions can comprises one or more pH-buffering agents selected from the group of phosphate buffers, bicarbonate buffers tris buffers or a combination of the latter.

The microbial consortium can be provided as a composition which comprises an amount of one or more pH-buffering agents such that the pH of such composition is optimal for one or more strains composing the microbial consortium.

Enzymatic reactions are often oxidation-reduction reactions. In such reactions, one compound is oxidized while another compound is reduced. The ability of an organism to carry out oxidation-reduction reactions depends mainly on the reduction potential of the environment.

As used herein, the term "redox potential" refers to the tendency of a chemical species to acquire electrons, and thereby to be reduced.

The redox potential of the environment is an important parameter for the growth, development and survival of microbial strains since it is the environmental redox potential which determines whether enzymatic reactions can be carried out by cells. In general, aerobic microorganisms are active at environments with a positive redox potential—high tendency of environment to acquire electrons—whereas strictly anaerobic microorganisms are active at environments with a negative redox potential—high tendency of environment to donate electrons. In addition, the redox potential of an environment determines the solubility of nutrients.

The redox potential of an environment—such as a composition comprising a microbial consortium according to the present invention—can be adapted, and thereby optimized, by addition of one or more redox potential regulators to the environment. More in particular, the redox potential of an environment can be lowered by addition of one or more reducing compounds, whereas the redox potential of an environment can be increased by addition of one or more oxidizing compounds.

Addition of one or more redox potential regulators in a composition comprising a microbial consortium according to the present invention allows for inducing and/or maintaining an optimal redox potential in the composition. Preferably, the redox potential of such composition is induced and/or maintained at the redox potential which is optimal for strains of the microbial consortium present in said composition.

The microbial consortium can be provided as part of a composition comprising one or more redox potential regulators. The microbial consortium can be provided as part of a composition which comprises one or more redox potential regulators selected from the group of nitrate-nitrite, manganese oxide-manganese ion redox couple and peroxide.

The microbial consortium according to the invention may be provided as part of a composition which comprises one or more surface active agents. The composition may be provided with one or more surface active agents selected from the group of surfactants, and emulsifiers.

The microbial consortium can be provided as part of a composition which comprises one or more surfactants. Preferably, the composition comprises one or more surfactants selected from the group of alkyl sulphates and sulphonates, alkyl ethoxylates and zwitter ionic molecules.

The microbial consortium can be provided as part of a composition which may comprise a nonionic surfactant. The non-ionic surfactants may comprise alkoxylated surfactant, alkyl polysaccharides, block copolymers of ethylene oxide and propylene oxide, fluoro surfactants and silicon based surfactants, amine oxide surfactants, and mixtures thereof.

A preferred class of non-ionic surfactants is alkoxylated nonionic surfactant. The alkoxylated nonionic surfactant of the present invention are either linear or branched, and contain from 8 carbon atoms to 16 carbon atoms in the hydrophobic tail, and from 3 ethylene oxide units to 25 ethylene oxide units in the hydrophilic head group. Examples of alkyl ethoxylates include Neodol 91-6®, Neodol 91-8® supplied by the Shell Corporation (P.O. Box 2463, 1 Shell Plaza, Houston, Tex.), and Alfonic 810-60® supplied by Condea Corporation, (900 Threadneedle P.O. Box 19029, Houston, Tex.). More preferred alkyl ethoxylates comprise from 9 to 12 carbon atoms in the hydrophobic tail, and from 4 to 9 oxide units in the hydrophilic head group. A most preferred alkyl ethoxylate is $C_{9-11}$ EO5, available from the Shell Chemical Company under the tradename Neodol 91-5®. Alkyl ethoxylates can also be derived from branched alcohols. For example, alcohols can be made from branched olefin feedstocks such as propylene or butylene.

The non-ionic surfactant may comprise alkyl polysaccharides. Such surfactants are disclosed in U.S. Pat. Nos. 4,565,647, 5,776,872, 5,883,062, and 5,906,973. The alkyl polysaccharides may comprise alkyl polyglycosides comprising five and/or six carbon sugar rings, such as six carbon sugar ring derived from glucose, i.e., alkyl polyglucosides ("APG"). The alkyl substituent in the APG chain length is preferably a saturated or unsaturated alkyl moiety containing from 8 to 16 carbon atoms, with an average chain length of 10 carbon atoms. $C_8$-$C_{16}$ alkyl polyglucosides are commercially available from several suppliers (e.g., Simusol® surfactants from Seppic Corporation, 75 Quai d'Orsay, 75321 Paris, Cedex 7, France, and Glucopon 220®, Glucopon 225®, Glucopon 425®, Plantaren 2000 N®, and Plantaren 2000 N UP®, from Cognis Corporation, Postfach 13 01 64, D 40551, Dusseldorf, Germany).

The non-ionic surfactant may have an HLB value comprised between 10 and 19.5, or between 11 and 19, or between 12 and 18.5. Preferably, the nonionic surfactant is liquid at 25° C.

The microbial consortium may be provided as part of a composition which may comprise from 0.01% to 15% by weight of nonionic surfactant, for instance from 0.02% to 10%, or from 0.05% to 5%. For maintenance compositions for providing low levels of cleaning, the composition may comprise less than 2%, or less than 1%, or less than 0.5%, or less than 0.2% of nonionic surfactant.

The microbial consortium may be provided as part of a composition which may comprise from 0.01% to 15% by weight of alkoxylated nonionic surfactant, for example from 0.02% to 10% or from 0.05% to 5%. The composition may comprise less than 2% or less than 1% or less than 0.5% or less than 0.2% of alkoxylated nonionic surfactant.

Preferably, the microbial consortium can be provided as part of a composition which comprises one or more amine oxide surfactant. Suitable amine oxide are according to the formula: $R_1R_2R_3NO$ wherein each of $R_1$, $R_2$ and $R_3$ is independently a saturated or unsaturated, substituted or unsubstituted, linear or branched, hydrocarbon chain of from 1 to 30 carbon atoms. Preferred amine oxide surfactants to be used according to the present invention are amine oxides having the following formula: $R_1R_2R_3NO$ wherein $R_1$ is an hydrocarbon chain comprising from 1 to 30 carbon atoms, preferably from 6 to 20, more preferably from 8 to 16 and wherein $R_2$ and $R_3$ are independently saturated or unsaturated, substituted or unsubstituted, linear or branched hydrocarbon chains comprising from 1 to 4 carbon atoms, preferably from 1 to 3 carbon atoms, and more preferably are methyl groups. $R_1$ may be a saturated or unsaturated, substituted or unsubstituted, linear or branched, hydrocarbon chain.

Suitable amine oxides for use herein are for instance preferably $C_{12}$-$C_{14}$ dimethyl amine oxide, commercially available from Albright & Wilson, $C_{12}$-$C_{14}$ amine oxides commercially available under the trade name Genaminox® LA, from Clariant or AROMOX® DMC from AKZO Nobel, from Huntsman Amine, $C_{12-14}$ alkyldimethyl, N-Oxide, EMPIGEN® OB/EG.

The microbial consortium may be provided as part of a composition which may comprise from 0.02% to 30% by weight of amine oxide surfactant, for instance from 0.05% to 20%, or from 0.1% to 10%, or from 0.2 to 5%, or from 0.3 to 2%, or from 0.4 to 1%.

The microbial consortium may be provided as part of a composition which may comprise one or more anionic surfactants. The anionic surfactants may comprise sulphated anionic surfactants, sulphonated anionic surfactants, and mixtures thereof.

Suitable sulphated anionic surfactants for use herein are all those commonly known by those skilled in the art. Preferably, the sulphated anionic surfactants for use herein are selected from the group consisting of: alkyl sulphates; and alkylalkoxylated sulphates; and mixtures thereof.

Suitable alkyl sulphates for use herein include water-soluble salts or acids of the formula $ROSO_3M$ wherein R is a $C_6$-$C_{18}$ linear or branched, saturated or unsaturated alkyl group, preferably a $C_8$-$C_{16}$ alkyl group and more preferably a $C_{10}$-$C_{16}$ alkyl group, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like).

Particularly suitable linear alkyl sulphates include $C_{12-14}$ alkyl sulphate like EMPICOL® 0298/, EMPICOL® 0298/F or EMPICOL® XLB commercially available from ALBRIGHT & WILSON.

By "linear alkyl sulphate" it is meant herein a non-substituted alkyl sulphate wherein the linear alkyl chain comprises from 6 to 16 carbon atoms, preferably from 8 to 14 carbon atoms, and more preferably from 10 to 14 carbon atoms, and wherein this alkyl chain is sulphated at one terminus.

Suitable sulphonated anionic surfactants for use herein are all those commonly known by those skilled in the art. Preferably, the sulphonated anionic surfactants for use herein are selected from the group consisting of: alkyl sulphonates; alkyl aryl sulphonates; naphthalene sulphonates; alkyl alkoxylated sulphonates; and $C_6$-$C_{16}$ alkyl alkoxylated linear or branched diphenyl oxide disulphonates; and mixtures thereof.

Suitable alkyl sulphonates for use herein include water-soluble salts or acids of the formula $RSO_3M$ wherein R is a $C_6$-$C_{18}$ linear or branched, saturated or unsaturated alkyl group, preferably a $C_8$-$C_{16}$ alkyl group and more preferably a $C_{10}$-$C_{16}$ alkyl group, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like).

Suitable alkyl aryl sulphonates for use herein include water-soluble salts or acids of the formula $RSO_3M$ wherein R is an aryl, preferably a benzyl, substituted by a $C_6$-$C_{18}$ linear or branched saturated or unsaturated alkyl group, preferably a $C_8$-$C_{16}$ alkyl group and more preferably a $C_{10}$-$C_{16}$ alkyl group, and M is H or a cation, e.g., an alkali metal cation (e.g., sodium, potassium, lithium, calcium, magnesium and the like) or ammonium or substituted ammonium (e.g., methyl-, dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like).

Particularly suitable linear alkyl sulphonates include $C_{12}$-$C_{16}$ paraffin sulphonate like Hostapur® SAS commercially available from Hoechst. Particularly preferred alkyl aryl sulphonates are alkyl benzene sulphonates commercially available under trade name Nansa® available from Albright & Wilson.

By "linear alkyl sulphonate" it is meant herein a non-substituted alkyl sulphonate wherein the alkyl chain comprises from 6 to 18 carbon atoms, preferably from 8 to 16 carbon atoms, and more preferably from 10 to 16 carbon atoms, and wherein this alkyl chain is sulphonated at one terminus.

Suitable alkoxylated sulphonate surfactants for use herein are according to the formula $R(A)_mSO_3M$, wherein R is an unsubstituted $C_6$-$C_{18}$ alkyl, hydroxyalkyl or alkyl aryl group, having a linear or branched $C_6$-$C_{18}$ alkyl component, preferably a $C_8$-$C_{16}$ alkyl or hydroxyalkyl, more preferably $C_{12}$-$C_{16}$ alkyl or hydroxyalkyl, and A is an ethoxy or propoxy or butoxy unit, and m is greater than zero, typically between 0.5 and 6, more preferably between 0.5 and 3, and M is H or a cation which can be, for example, a metal cation (e.g., sodium, potassium, lithium, calcium, magnesium, etc.), ammonium or substituted-ammonium cation. Alkyl ethoxylated sulphonates, alkyl butoxylated sulphonates as well as alkyl propoxylated sulphonates are contemplated herein. Specific examples of substituted ammonium cations include methyl-, dimethyl-, trimethyl-ammonium and quaternary ammonium cations, such as tetramethyl-ammonium, dimethyl piperdinium and cations derived from alkanolamines such as ethylamine, diethylamine, triethylamine, mixtures thereof, and the like.

Exemplary surfactants are $C_{12}$-$C_{18}$ alkyl polyethoxylate (1.0) sulphonate ($C_{12}$-$C_{18}$E(1.0)SM), $C_{12}$-$C_{18}$ alkyl polyethoxylate (2.25) sulphonate ($C_{12}$-$C_{18}$E(2.25)SM), $C_{12}$-$C_{18}$ alkyl polyethoxylate (3.0) sulphonate ($C_{12}$-$C_{18}$E(3.0)SM), and $C_{12}$-$C_{18}$ alkyl polyethoxylate (4.0) sulphonate ($C_{12}$-$C_{18}$E(4.0)SM), wherein M is conveniently selected from sodium and potassium. Particularly suitable alkoxylated sulphonates include alkyl aryl polyether sulphonates like Triton X-200® commercially available from Dow Chemical.

Preferably said sulphated or sulphonated anionic surfactant for use herein is selected from the group consisting of alkyl sulphates (AS) preferably $C_{12}$, $C_{13}$, $C_{14}$ and $C_{15}$ AS, sodium linear alkyl sulphonate (NaLAS), sodium paraffin sulphonate $NaPC_{12-16}S$, and mixtures thereof. Most preferably sulphated or sulphonated anionic surfactant for use herein is selected from the group consisting of alkyl sulphates (AS) preferably, $C_{12}$, $C_{13}$, $C_{14}$ and $C_{15}$ AS, sodium linear alkyl sulphonate (NaLAS), sodium paraffin sulphonate $NaPC_{12-16}S$ and mixtures thereof.

Typically, the microbial consortium can be provided as part of a liquid composition which may comprise from 0.5% to 9.5% by weight of the total composition of said sulphated or sulphonated anionic surfactant, preferably from 1.0% to 5.0%, more preferably from 1.5% to 3.5% and most preferably from 2.0% to 3.0%.

The microbial consortium can be provided as part of a composition which may comprise from 0.02% to 10% by weight of anionic surfactant, for instance from 0.05% to 5%, or from 0.2 to 5%, or from 0.3 to 2%, or from 0.4 to 1%.

The microbial consortium may be provided as part of a composition which may comprise one or more fatty acids, as suds suppressors. Suitable fatty acids include the alkali salts of a $C_8$-$C_{24}$ fatty acid. Such alkali salts include the metal fully saturated salts like sodium, potassium and/or lithium salts as well as the ammonium and/or alkylammonium salts of fatty acids, preferably the sodium salt. The fatty acid may be linear or branched. Suitable linear fatty acids for use herein contain from 8 to 22, preferably from 8 to 20 and more preferably from 8 to 18 carbon atoms. Suitable fatty acids may be selected from caprylic acid, capric acid, lauric acid, myristic acid, palmitic acid, stearic acid, oleic acid, and mixtures of fatty acids suitably hardened, derived from natural sources such as plant or animal esters (e.g., palm oil, olive oil, coconut oil, soybean oil, castor oil, tallow, ground oil, whale and fish oils and/or babassu oil. For example coconut fatty acid is commercially available from KLK OLEA under the name PALMERAB1211.

The microbial consortium may be provided as a composition which may comprise up to 6.0% by weight of the total composition of said fatty acid, preferably from 0.1% to 3.0%, more preferably from 0.1% to 2.0% and most preferably from 0.15% to 1.5% by weight of the total composition of said fatty acid.

The microbial consortium can be provided as part of a composition which may comprise with one or more emulsifiers selected from the group of natural compounds such as alginates, carrageenan gums, glycerols and waxes; alcohols, esters of any origin or various bile salt related chemicals. Presence of microorganisms is often related with a bad and/or undesired smell. The microbial consortium may be provided as part of a composition which may comprise one or more odor-controlling agents. Such odor-controlling agents may comprise agents which neutralize such bad and/or undesired smells, and/or the odor-controlling agents may comprise agents which induce or provide a more desired smell to composition comprising the microbial consortium.

The microbial consortium may be provided as part of a composition which may comprise one or more odor-controlling agents which may be selected from the group of natural oils and perfumes and fragrances, chemicals adsorbing or trapping odor compounds such as zeolites, cyclodextrins, synthetic esters or ethers and other configurations capable to mask odor.

The microbial consortium can be provided as part of a composition which may comprise one or more thickeners. An increased viscosity, in combination with detersive surfactant, provides longer contact time and therefore improved penetration of greasy soil and/or particulated greasy soil to improve cleaning effectiveness, especially when applied neat to the surface to be treated. In addition, an increased viscosity, especially a high low shear viscosity improves the phase stability of the liquid composition. Hence, the composition comprising a thickener, can have a viscosity of from 50 Pa·s to 650 Pa·s, more preferably 100 Pa·s to 550 Pa·s, most preferably 150 Pa·s to 450 Pa·s, at 20° C. when measured with a AD1000 Advanced Rheometer from Atlas® shear rate 10 $s^{-1}$ with a coned spindle of 40 mm with a cone angle 2° and a truncation of ±60 μm.

Suitable thickeners include polyacrylate based polymers, preferably hydrophobically modified polyacrylate polymers; hydroxyl ethyl cellulose, preferably hydrophobically modified hydroxyl ethyl cellulose, xanthan gum, hydrogenated castor oil (HCO) and mixtures thereof.

Preferred thickeners are polyacrylate based polymers, preferably hydrophobically modified polyacrylate polymers. Preferably a water soluble copolymer based on main monomers acrylic acid, acrylic acid esters, vinyl acetate, methacrylic acid, acrylonitrile and mixtures thereof, more preferably copolymer is based on methacrylic acid and acrylic acid esters having appearance of milky, low viscous dispersion. Most preferred hydrologically modified polyacrylate polymer is Rheovis® AT 120, which is commercially available from BASF.

Other suitable thickeners are hydroxyethylcelluloses (HM-HEC) preferably hydrophobically modified hydroxyethylcellulose. Suitable hydroxyethylcelluloses (HM-HEC) are commercially available from Aqualon/Hercules under the product name Polysurf 76® and W301 from 3V Sigma.

Xanthan gum is one suitable thickener used herein. Xanthan gum is a polysaccharide commonly used rheoligy modifier and stabilizer. Xanthan gum is produced by fermentation of glucose or sucrose by the *Xanthomonas campestris* bacterium. Suitable Xanthan gum is commercially available under trade name Kelzan T® from CP Kelco.

Hydrogenated castor oil is one suitable thickener used herein. Suitable hydrogenated castor oil is available under trade name THIXCIN R from Elementis.

When used, the liquid composition can comprise from 0.1% to 10.0% by weight of the total composition of said thickener, preferably from 0.2% to 5.0%, more preferably from 0.2% to 2.5% and most preferably from 0.2% to 2.0%.

The microbial consortium may be provided as part of a composition which may comprise one or more chelating agents or one or more crystal growth inhibitors. Suitable chelating agents, in combination with the surfactant system, improve the shine benefit. Chelating agent can be incorporated into the compositions in amounts ranging from 0.05% to 5.0% by weight of the total composition, preferably from 0.1% to 3.0%, more preferably from 0.2% to 2.0% and most preferably from 0.2% to 0.4%.

Suitable phosphonate chelating agents include ethylene diamine tetra methylene phosphonates, and diethylene triamine penta methylene phosphonates (DTPMP). The phosphonate compounds may be present either in their acid form or as salts of different cations on some or all of their acid functionalities. Preferred phosphonate chelating agent to be used herein is diethylene triamine penta methylene phosphonate (DTPMP). Such phosphonate chelating agents are commercially available from Monsanto under the trade name DEQUEST®.

A preferred biodegradable chelating agent for use herein is ethylene diamine N,N'-disuccinic acid, or alkali metal, or alkaline earth, ammonium or substitutes ammonium salts thereof or mixtures thereof. Ethylenediamine N,N'-disuccinic acids, especially the (S,S) isomer have been extensively described in U.S. Pat. No. 4,704,233, Nov. 3, 1987, to Hartman and Perkins. Ethylenediamine N,N'-disuccinic acids is, for instance, commercially available under the tradename (S,S)EDDS® from Palmer Research Laboratories. Most preferred biodegradable chelating agent is L-glutamic acid N,N-diacetic acid (GLDA) commercially available under tradename Dissolvine 47S from Akzo Nobel.

Suitable amino carboxylates for use herein include ethylene diamine tetra acetates, diethylene triamine pentaacetates, diethylene triamine pentaacetate (DTPA), N-hydroxyethylethylenediamine triacetates, nitrilotriacetates, ethylenediamine tetra propionates, triethylenetetraamine-hexa-acetates, ethanoldiglycines, and methyl glycine diacetic acid (MGDA), both in their acid form, or in their alkali metal, ammonium, and substituted ammonium salt forms. Particularly suitable amino carboxylate to be used herein is propylene diamine tetracetic acid (PDTA) which is, for instance, commercially available from BASF under the trade name Trilon FS® and methyl glycine di-acetic acid (MGDA). Most preferred aminocarboxylate used herein is diethylene triamine pentaacetate (DTPA) from BASF. Further carboxylate chelating agents for use herein include salicylic acid, aspartic acid, glutamic acid, glycine, malonic acid or mixtures thereof.

The microbial consortium can be provided as part of a formulation which may comprise one or more compounds which improve the outlook of a surface on which the formulation is applied. More preferably, a microbial consortium is provided as a formulation which comprises one or more compounds selected from the group of metal sequestering agents such as polyphosphates, EDTA, EDDS, NTA, hydroxycarboxylic acids, phosphonates.

The microbial consortium can be provided as part of a composition which may comprise a polymer. It has been found that the addition of a specific polymer as described herein, when present, allows further improving the grease removal performance of the microbial consortium. Due to the specific sudsing/foaming characteristics they provide to the composition. Suitable polymers for use herein are disclosed in co-pending EP patent application EP2272942 (09164872.5) and granted European patent EP2025743 (07113156.9).

The polymer can be selected from the group consisting of: a vinylpyrrolidone homopolymer (PVP); a polyethyleneglycol dimethylether (DM-PEG); a vinylpyrrolidone/dialkylaminoalkyl acrylate or methacrylate copolymers; a polystyrenesulphonate polymer (PSS); a poly vinyl pyridine-N-oxide (PVNO); a polyvinylpyrrolidone/vinylimidazole copolymer (PVP-VI); a polyvinylpyrrolidone/polyacrylic acid copolymer (PVP-AA); a polyvinylpyrrolidone/vinylacetate copolymer (PVP-VA); a polyacrylic polymer or polyacrylicmaleic copolymer; and a polyacrylic or polyacrylic maleic phosphono end group copolymer; a copolymer comprising EO and PO groups; and mixtures thereof.

The microbial consortium may be provided as part of a composition which may comprise from 0.005% to 5.0% by weight of the total composition of said polymer, preferably from 0.10% to 4.0%, more preferably from 0.1% to 3.0% and most preferably from 0.20% to 1.0%.

The microbial consortium may be provided with a solvent. Suitable solvents may be selected from the group consisting of: ethers and diethers having from 4 to 14 carbon atoms; glycols or alkoxylated glycols; alkoxylated aromatic alcohols; aromatic alcohols; alkoxylated aliphatic alcohols; aliphatic alcohols; $C_8$-$C_{14}$ alkyl and cycloalkyl hydrocarbons and halohydrocarbons; $C_6$-$C_{16}$ glycol ethers; terpenes; and mixtures thereof.

The microbial consortium is preferably provided as part of a composition which may comprise a perfume. Suitable perfumes provide an olfactory aesthetic benefit and/or mask any "chemical" odor that the product may have.

The microbial consortium may be provided as part of a composition which may comprise a variety of other optional substances depending on the technical benefit aimed for and the surface treated. Suitable optional substances for use herein include buffers, bactericides, hydrotropes, colorants, stabilizers, radical scavengers, abrasives, soil suspenders, brighteners, anti-dusting agents, dispersants, dye transfer inhibitors, pigments, silicones and/or dyes.

The microbial consortium may be provided as part of an aqueous composition which therefore comprises water. Such composition may comprise from 50% to 98%, even more preferably of from 75% to 97% and most preferably 80% to 97% by weight of water.

Selection of one or more specific additives as mentioned above can be based on the composition of the microbial consortium, and more in particular, on the identity of the strains present in said microbial consortium, and even more in particular, on the optimal and/or minimal growth conditions of strains composing said microbial consortium.

The microbial consortium can be provided as a composition which can be suitable for cleaning hard surfaces or textiles.

The microbial consortium may be provided as part of hard surface treatment compositions which are used for cleaning and treating hard surfaces. Preferably, such hard surface treatment composition can be formulated to be an "all purpose" hard surface treatment composition. That is, the hard surface treatment composition is formulated to be suitable for cleaning as many different kinds of surfaces as possible. Hard surface treatment compositions are typically diluted before use in a bucket before being applied to the surface being treated using a mop, sponge, cloth or similar device. Alternatively, they can be applied neat, directly onto the surface, for instance, using a sponge or a spray device.

By "hard surface treatment composition", it is meant herein a composition for treating hard surfaces found in households, especially domestic households. Surfaces to be treated include kitchens and bathrooms, e.g., floors, walls, tiles, windows, cupboards, sinks, showers, shower plastified curtains, wash basins, WCs, fixtures and fittings and the like made of different materials like ceramic, vinyl, no-wax vinyl, linoleum, melamine, glass, steel, kitchen work surfaces, any plastics, plastified wood, metal or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments. Hard surface cleaning compositions are typically formulated to also provide cleaning. As such, they typically comprise a detersive surfactant or solvent.

The microbial consortium may be provided as part of a textile treatment composition. "Textile treatment compositions" refers to any textile treatment composition capable of treating textiles such as fabric, upholstery, and the like. Textiles can be woven or non-woven and are typically flexible. Woven textiles include fabrics comprising natural fibers such as cotton, fabrics comprising synthetic fibers such as polyester, and fabrics comprising a blend of natural and synthetic fibers. Nonwoven textiles include fabrics made from short and long fibers (continuous long), bonded together by chemical, mechanical, heat or solvent treatment, as well as other textiles such as those derived from natural and/or synthetic leather, sponges, and the like. Such compositions can be applied to the textile in a washing machine (for instance, during the wash cycle but preferably during a rinse cycle), during hand-washing, or direct application to the textile, such as using a spray. Textile cleaning compositions are typically formulated to also provide cleaning. As such, they typically comprise a detersive surfactant or solvent.

The microbial consortium can also be provided as part of a composition which is suitable for treating both hard surfaces and textiles.

The microbial consortium or a composition comprising the microbial consortium can be formulated to be used as a spray.

The microbial consortium may be provided as part of a composition which may be packaged in a variety of suitable packaging known to those skilled in the art. The container may be made of plastic materials. The composition can be packaged in conventional detergent plastic bottles. The composition may be in compacted form, and may be suitable to be diluted, for example 15 times before use. Preferably the composition is packaged in a spray dispenser, such as a trigger spray dispenser or pump spray dispenser. The microbial consortium provided as part of compositions herein may be packaged in manually or electrically operated spray dispensing containers.

Accordingly, the microbial consortium of the present invention can be provided as part of composition which is comprised in a spray dispenser, preferably in a trigger spray dispenser or pump spray dispenser.

Indeed, said spray-type dispensers allow to uniformly apply to a relatively large area of a surface to be treated the microbial consortium. Such spray-type dispensers are particularly suitable to clean inclined or vertical surfaces. Spray dispensers allow for easy, safe, and accurate handling, application and use of the microbial consortium. Furthermore, a microbial consortium provided as a composition to be used as a spray allows for a well-aerated and evenly-distributed application of the microbial consortium to a surface, object and/or area. In addition, spray dispensers are particularly suited for the treatment of fabrics.

Suitable spray-type dispensers to be used according to the present invention include manually operated foam trigger type dispensers sold for example by Specialty Packaging Products, Inc. or Continental Sprayers, Inc. These types of dispensers are disclosed, for instance, in U.S. Pat. No. 4,701,311 to Dunnning et al. and U.S. Pat. Nos. 4,646,973 and 4,538,745 both to Focarracci. Particularly preferred to be used herein are spray-type dispensers such as T 8500® commercially available from Continental Spray International or T 8100® commercially available from Canyon, Northern Ireland. In such a dispenser, the liquid composition is divided in fine liquid droplets resulting in a spray that is directed onto the surface to be treated. Indeed, in such a spray-type dispenser a composition contained in the body of said dispenser is directed through the spray-type dispenser head via energy communicated to a pumping mechanism by the user as said user activates said pumping mechanism. More particularly, in said spray-type dispenser head a composition is forced against an obstacle, e.g., a grid or a cone or the like, thereby providing shocks to help atomize a microbial consortium which may be provided as a composition, i.e., to help the formation of liquid droplets.

The present invention also relates to the use of a microbial consortium according to the invention to suppress growth, proliferation and survival of one or more undesired microbial organisms on a surface. For instance, the present invention relates to the use of a microbial consortium to suppress growth and survival of non-GRAS microbial organisms on a surface.

In a plurality of situations, the presence of certain microorganisms is disadvantageous or unwanted. Especially the presence of non-GRAS microbial organisms is undesirable as these microorganisms may negatively affect higher organisms. As have been developed to sufficiently remove undesired and/or non-GRAS organisms, for example from surfaces. However, the methods and/or applications currently described in the art fail to provide an efficient and long-term removal of such microorganisms. A first problem in the current art relates to the inability of the currently available approaches to sufficiently and efficiently breach biofilms which protect present undesired microbial organisms. In a second aspect, current approaches are insufficient for inactivation and/or removal of spores that are produced by said undesired microorganisms. Furthermore, current approaches provide merely a temporary removal of such undesired microorganisms. More in particular, current approaches comprise disinfection of a surface, but do not comprise prevention or treatment of contamination by undesired microorganisms subsequent to disinfection of the treated surface.

In addition, chemical approaches often comprise toxic or harmful components, emit unpleasant odors, and may induce (de)coloration of a surface or object on which they are applied. Instead, the present invention provides for an efficient approach without such negative effects.

However, use of a microbial consortium according to the present invention provides in a long-term and efficient suppression of growth and survival of undesired microorganisms, such as for example, non-GRAS microorganisms.

More in particular, application of a microbial consortium according to the present invention enables population of a surface with the microbial consortium. Preferably, the microbial consortium comprises GRAS strains that are—in a first aspect—capable of breaching a biofilm present on said surface, preferably by means of enzymes. In this way, undesired microorganisms which are enclosed and protected by such biofilm become more exposed and vulnerable. In a second aspect, the use or application of a microbial consortium according to the present inventions allows for population of a microbial consortium on a surface. As mentioned above, said microbial consortium comprises one or more GRAS ammonium-oxidizing strains and one or more GRAS strains which are commensal to the one or more ammonium-oxidizing strains. Said one or more ammonium-oxidizing strains produce complex organic compounds which may serve as nutrients for said one or more commensal strains. As a consequence, said one or more commensal strains will grow rapidly, and in time, one or more commensal strains will thrive on the surface. Thriving of the one or more commensal strains depletes the surface of space and nutrients for other strains, and thereby induces starvation of other—undesired—strains present on the surface. Hence, the use or application of a microbial consortium according to the present invention induces thriving of the one or more commensal strains, which, in turn, results in competitive exclusion of other, undesired microbial strains from the surface.

Evidently, some time passes between application of a microbial consortium, thriving of the one or more commensal strains and/or depletion of undesired strains on the surface.

Preferably, the use or application of a microbial consortium according to the present inventions allows thriving of the one or more commensal strains present in the microbial consortium within two days, preferably within one day, more preferably within 12 hours, even more preferably within 6 hours and most preferably one hour after use or application of said consortium. The length of such period depends on the composition of the microbial consortium and/or the composition of a formulation thereof. Preferably, the length of said period mainly depends on the population density and ratio of the microbial consortium.

Thriving of the one or more commensal strains on a surface continues for a longer period of time. As a consequence, a surface on which a microbial consortium according to the present invention is applied will be protected from unwanted growth and substantial survival of undesired microorganisms for a longer period of time. Hence, use or application of a microbial consortium according to the invention on a surface even suppresses growth and survival of undesired microorganisms which contact or contaminate the surface subsequent to the application of the microbial consortium. In this way, the use or application of a microbial consortium according to the present invention allows fending of undesired microorganisms for a longer period of time. The period in which a surface is protected depends on the availability of nutrients and space on that surface, on the environmental conditions and environmental presence of competitive strains, and on the ratio, composition and density of the microbial consortium, which may be provided as a formulation.

Preferably, a surface on which a microbial consortium according to the present invention is applied, is protected from undesired microorganisms until the one or more ammonium-oxidizing strains are also competitively excluded from the surface such that there are no sufficient amounts of nutrients anymore to maintain the thriving of the one or more commensal microorganisms. Preferably, a surface on which a microbial consortium according to the present invention is used, is sufficiently protected from undesired microorganisms for at least 1 day, preferably at least 2 days, more preferably at least 7 days, and most preferably at least 14 days.

It would be obvious to a skilled person that a microbial consortium according to the present invention may be provided as a formulation, such as a cleaning formulation.

Application or use of a microbial consortium according to the present invention can suppress growth and survival of one or more non-GRAS microorganisms selected from the group of *Escherichia coli, Enterococcus faecalis* and *Pseudomonas aeruginosa*.

The microbial consortium according to the present invention may be used for suppression of growth and survival of undesired microorganisms, preferably non-GRAS microorganisms, on both hard and soft surfaces. As such, microbial recolonization of a surface may be achieved, by treating the surface with the microbial consortium, for instance by providing a surface treatment composition comprising the microbial consortium, and applying said composition to a surface. As such, a method is taught herein, whereby the method comprises the step of: applying the microbial consortium, for instance as part of a surface treatment composition, to a hard surface or textile, wherein the microbial consortium comprises:

a) one or more ammonium-oxidizing strains which are generally recognized as safe (GRAS), selected from the group of *Nitrosomonas, Nitrosospira, Nitrosopumilus, Cenarchaeum, Nitrosoarchaeum, Nitrosocaldus*, and *Caldiarchaeum*; and b) one or more GRAS strains which are commensal to the one or more ammonium-oxidizing strains, and which are selected from the group of *Acinetobacter, Alcaligenes, Arthrobacter, Azospirillum, Azotobacter, Bacillus, Beijerinckia, Enterobacter, Erwinia, Flavobacterium, Rhizobium, Serratia* and *Deinococcus*.

The result of this method is that the surface is populated by the microbial consortium. The microbial consortium or the composition comprising the microbial consortium can be applied neat or in diluted form. Preferably, the microbial consortium or the composition comprising the microbial consortium is applied as a spray, in order to achieve a uniform distribution over the hard surface or textile. The microbial consortium or the composition comprising the microbial consortium is preferably left on the hard surface or textile for at least 1 hour, preferably at least 4 hours, more preferably at least 12 hours, most preferably at least 24 hours. Optionally, the microbial consortium or the composition comprising the microbial consortium can then be reapplied and left on the hard surface or textile for an additional period of at least 1 hour, preferably at least 4 hours, more preferably at least 12 hours, most preferably at least 24 hours, in order to increase the population of the microbiome consortium on the treated hard surface or textile.

Before applying the microbial consortium or the composition comprising the microbial consortium, the hard surface or textile can be pretreated. Suitable pretreatment of the hard surface or textile includes: wiping, for instance using a clean cloth; moistening; cleaning; and combinations thereof. Moistening, cleaning, and combinations thereof is particularly preferred.

It has been found that moistening the surface or textile before application of the microbial consortium or the composition comprising the microbial consortium improves the distribution and proliferation of the microbiome on the treated hard surface or textile.

It has been found that cleaning the surface or textile before application of the microbial consortium or the composition comprising the microbial consortium improves the growth, proliferation and survivability of the microbiome consortium on the treated surface or textile. It is believed that the cleaning the surface or textile reduces or eliminates the microbes present on the surface before application of the microbial consortium or the composition comprising the microbiome consortia. As a result, there is less competition for the microbiome consortia after application of the microbial consortium or the composition, which makes it easier for the microbial consortia to be established on the treated hard surface or textile. Even cleaning with water (such as wiping with a damp clean cloth) can reduce the microbe population on the surface or textile to be treated. The use of a cleaning composition comprising detersive surfactant is more efficacious for reducing the microbe population on the surface or textile to be treated. Most preferably, an antimicrobial composition, such as an antimicrobial hard surface cleaning composition or bleach is used, since they remove virtually all microbes form the hard surface or textile to be treated.

In a third aspect, a method for microbial recolonization of a surface is provided, wherein the method comprises the steps of providing a microbial consortium according to the present invention and applying said microbial consortium to a surface.

It would be obvious to a skilled person that the microbial consortium may be provided as a formulation, such as an aqueous composition or an aqueous suspension.

Applying the provided microbial consortium to a surface allows thriving of the one or more commercial strains on the surface as mentioned above. This, in turn, induces starvation and competitive exclusion of other microorganisms present on the surface. As a consequence, the surface will become recolonized by the microbial consortium.

Due to the less efficient carbon fixation of the one or more ammonium-oxidizing strains as compared to the one or more commensal strains, the ammonium-oxidizing strains will—after a period of time—be competitively excluded from growing on the surface by the one or more commensal strains. This, in turn, will result in a depletion of the complex organic compounds produced by the one or more ammonium-oxidizing strains which serve as nutrients for the one or more commensal strains.

In another preferred embodiment, one or more of the commensal strains of a microbial consortium are capable of growing and surviving on dirt and components which contaminates the surface. In this way, a method according to the present invention provides recolonization of a surface for an extended period of time.

In another preferred embodiment, one or more ammonium-oxidizing strains may be applied to the recolonized surface to provide nutrients to the one or more commensal strains, and hence, to continue recolonization of said surface.

In another embodiment, a microbial consortium according to the present invention is applied on a regular interval to the surface for recolonization of said surface.

A method for recolonization of a surface according to the present teachings allows suppressing, depleting and/or removing one or more unwanted microorganisms such as non-GRAS microorganisms. Hence, a method according to the present invention may be performed as a cleaning method.

In a preferred embodiment, the amount of microbial consortium to be applied to a surface is determined based on the composition of the provided microbial consortium—in particular, population density, characteristics of the microbial consortium, and the ratio of the amount of cells of ammonium-oxidizing strains over amount of cells of one or more commensal strains—and the environment in which the surface is located. A surface in more hostile or competitive environments or environments which require a very strict hygiene protocol may require higher amounts of microbial consortium per area of surface to achieve recolonization of a surface.

By preference, an amount or volume equivalent to 10 000 000 to 100 000 000 microorganisms of the bacterial consortium is applied per square meter of the surface.

In a preferred embodiment of a method according to the present teachings, the provided microbial consortium is applied onto the surface by means of spraying.

Applying the provided microbial consortium by means of spraying allows for safe application of the consortium to the surface as there is no need for directly contacting the surface. This is particularly important when harmful and/or non-GRAS microorganisms are present on said surface. Further advantages of applying the microbial consortium to a surface by means of spraying comprise easy, accurate and evenly-distributed application of the microbial cells, and allows for sufficient aeration of the cells of the microbial consortium. The latter is of particular relevance for aerobic strains.

In a preferred embodiment, the provided microbial consortium can be applied to both hard and soft surfaces.

The invention claimed is:

1. A microbial consortium which comprises:
   one or more ammonium-oxidizing strains which are generally recognized as safe (GRAS), selected from the group of *Nitrosomonas, Nitrosospira, Nitrosopumilus, Cenarchaeum, Nitrosoarchaeum, Nitrosocaldus*, and *Caldiarchaeum*; and
   one or more GRAS strains which are commensal to the one or more ammonium-oxidizing strains, and which are selected from the group of *Acinetobacter, Alcali-* genes, *Arthrobacter, Azospirillum, Azotobacter, Bacillus, Beijerinckia, Enterobacter, Erwinia, Flavobacterium, Rhizobium, Serratia* and *Deinococcus*, wherein the microbial consortium comprises cells of the one or more ammonium-oxidizing strains in a ratio of between 100:10 and 100:0.1 as compared to cells of the one or more commensal strains.

2. Microbial consortium according to claim 1, characterized in that said consortium comprises at least two ammonium-oxidizing strains, and at least three commensal strains.

3. Microbial consortium according to claim 2, characterized in that the microbial consortium comprises an excess of the one or more ammonium-oxidizing strains as compared to the one or more commensal strains.

4. Microbial consortium according to claim 1, characterized in that the microbial consortium comprises biomass of the one or more ammonium-oxidizing strains in a ratio between 100:10 and 100:0.1 as compared to biomass of the one or more commensal strains.

5. Microbial consortium according to claim 1, characterized in that the microbial consortium comprises one or more ammonium-oxidizing strains selected from the group of *Nitrosomonas marina, Nitrosomonas nitrosa, Nitrosomonas eutropha, Nitrosomonas europaea, Nitrosomonas cryotolerans, Nitrosospira multiformis, Nitrosospira lacus, Nitrosopumilus maritimus, Cenarchaeum symbiosum, Nitrosoarchaeum limnia, Nitrosocaldus yellowstonii*, and *Caldiarchaeum subterraneum*.

6. Microbial consortium according to claim 1, characterized in that the microbial consortium comprises one or more commensal strains selected from the group of *Bacillus subtilis, Bacillus megaterium, Bacillus polymyxa, Bacillus amyloliquefaciens, Bacillus cereus, Bacillus japonicum* or from the group of *Deinococcus*.

7. Microbial consortium according to claim 1, characterized in that the microbial consortium shows an enhanced resilience as compared to a separate population of the one or more ammonium-oxidizing strains present in said microbial consortium and to a separate population of the one or more commensal strains present in said microbial consortium.

8. Microbial consortium according to claim 1, characterized in that the nitrifying activity of the microbial consortium is at least 0.16 g nitrogen/g volatile suspended solids (VSS) per day.

9. Microbial consortium according to claim 1, characterized in that the oxygen uptake rate of the microbial consortium is at least 8 mg O2/g VSS per hour.

10. A formulation comprising the microbial consortium of claim 1 in the form of an aqueous composition or an aqueous suspension.

11. A formulation comprising the microbial consortium according to claim 1, and further comprising one or more of a surfactant, emulsifier, fatty acid, odor-controlling agent, thickener, chelating agent, crystal growth inhibitor, polymer, solvent, or perfume.

* * * * *